3,264,083
PLANT GROWTH STIMULATING METHOD
AND COMPOSITIONS
William Harris Davies, Blackley, Manchester, Roy Cotterell, Bracknell, and Dyfrig Gruffydd Morgan, Histon, England, assignors to Imperial Chemical Industries Limited, London, England, a corporation of Great Britain
No Drawing. Filed Oct. 4, 1961, Ser. No. 142,787
Claims priority, application Great Britain, Oct. 5, 1960, 34,130/60
4 Claims. (Cl. 71—2.3)

This invention relates to compositions for use in agriculture and horticulture.

According to the present invention therefore we provide novel compositions, each of which includes as its essential constituent at least one compound of the formula

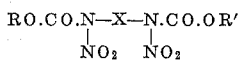

in which R and R' are alkyl, cycloalkyl, phenyl or alkyl phenyl radicals and may contain up to eleven carbon atoms each, and X is ethylene, trimethylene or propylene, or tetramethylene.

Whereas R and R' may be different radicals, they are conveniently identical. They preferably contain no more than six carbon atoms each and are preferably alkyl or cycloalkyl radicals.

It is preferred that X be ethylene.

As examples of the essential constituents of our compositions there may be mentioned the following compounds which have been tested and found to have plant growth promoting, stimulating and regulating properties.

Ethylene-bis-N:N'-nitro-urethane
Ethylene-bis-N:N'-nitro-methyl-carbamate
[1] Ethylene-bis-N:N'-nitro-n-propyl-carbamate
[1] Ethylene-bis-N:N'-nitro-iso-propyl-carbamate
[1] Ethylene-bis-N:N'-nitro-n-butyl-carbamate
[2] Ethylene-bis-N:N'-nitro-iso-butyl-carbamate
[1] Ethylene-bis-N:N:'-nitro-iso-amyl-carbamate
[1] Ethylene-bis-N:N'-nitro-cyclohexyl-carbamate
[1] Propylene-bis-N:N'-nitro-urethane
[1] Trimethylene-bis-N:N'-nitro-urethane
[1] Tetramethylene-bis-N:N'-nitro-ethyl-carbamate.

The compounds marked ([1]) are new compounds, and are the subject of co-pending British application No. 12,783/60. The compound marked ([2]) is a new compound, and is the subject of co-pending British application No. 40,166/60.

According to the invention the compositions may be in either solid or liquid form. The solid compositions of the present invention may, in addition to the essential constituent, contain solid diluents or carriers which may be, for example, inert pulverulent diluents or materials beneficial for use in horticulture and agriculture, or mixtures thereof. The concentration of the active compound in the composition may vary widely. Compositions in which this concentration by weight of the mixture is from 0.5% to 25%, are suitable for most purposes. As examples, compositions in which it is from 5% to 20% are very suitable for dusting peas, e.g. at a rate of 0.5% by weight; and compositions in which it is from 50% to 95% are very suitable for dusting sugar beet. Compositions suitable for combine drilling with cereals contain from 1% to 5% by weight of the active compound, and may be applied, for example, at a rate of 1 cwt. per acre. Thus, the compositions may comprise mixtures of the said essential constituent together with an inert solid such as chalk, talc, kieselguhr, bentonite or china clay (other suitable materials are slate dust, gypsum, anhydrite, and limestone) and they may also comprise mixtures of the said essential constituent together with for example plant nutrient material, pesticides, or soil conditioning material. For example, as suitable plant nutrient, they may contain ammonium sulphate or ammonium nitrate, urea and compounds containing phosphorus e.g. monammonium phosphate, diammonium phosphate, and ordinary or triple superphosphate, or potassium, e.g. the chloride, sulphate or nitrate, basic slag; these substances may be contained in the compositions of the present invention either alone or in admixture to give mixed fertilizer compositions. The compositions may also contain herbicides such as the phenoxy substituted aliphatic monocarboxylic acids containing chlorine atoms and methyl groups substituted in the benzene ring, while fungicides such as dithiocarbamates and organomercuric compounds may also be present. Furthermore the compositions may also contain insecticides such as organophosphorus compounds and chlorinated hydrocarbons. Peat, spent hops and malt may also be persent.

In such fertilizer compositions, e.g. N.P.K. fertilizers, the concentration of the active compound may be, for example, from 0.1% to 5%, preferably from 1% to 5% by weight of the mixture. Thus fertilizers suitable for combine drilling with cereals contain from 0.3% to 1.5% of the active compound expressed aforesaid and may be applied at a rate of 3 cwts. per acre.

The compositions may be in the form of powder, pellets, granules or irregular fragments according to the way they are to be used. They may, for example, be applied to the medium in which the plants are to be grown or are growing or they may be applied to the seed, seedlings, or growing plants. It will be understood therefore that the compositions may be applied in a variety of ways, for example by direct application of the solid composition to the growing medium, the seed or the plant, or if desired, they may be applied after dissolving or otherwise dispersing in a suitable liquid medium, which may contain, for example, surface-active agents, for example wetting, dispersing, emulsifying or stabilising agents.

The liquid compositions of the present invention may, in addition to the essential constituent, contain one or more inert liquid diluents and they may also contain materials beneficial for use in horticulture and agriculture. The liquid compositions may be in the form of, for example, solutions, suspensions or dispersions. As suitable liquid diluents there may be mentioned water and acetone. As suitable materials beneficial for use in horticulture or agriculture there may also be present in the compositions plant nutrient material, pesticides or soil conditioning material. For example the compositions may contain in solution or suspension ammonium sulphate or ammonium nitrate, urea or compounds containing phosphorus or potassium: these substances may be contained in the compositions either alone or in admixture to give mixed fertilizer compositions. The liquid compositions may also contain herbicides such as the phenoxy substituted aliphatic monocarboxylic acids containing chlorine atoms and methyl groups substituted in the benzene ring, while fungicides such as dithiocarbamates and organomercuric compounds may also be present. Furthermore the liquid compositions may also contain insecticides such as organophosphorus compounds and chlorinated hydrocarbons.

It will be understood that where any of the components are dispersed or suspended in the liquid compositions, it is preferable for the compositions to contain surface active agents which may be one or more wetting, dispersing, emulsifying or stabilising agents. It may be particularly desirable to provide for the presence of wetting agents, or surface active agents, particularly where the liquids of the present invention are to be applied to growing plants. It should be understood that the liquid compositions may be applied to the medium in which the plants are to be grown or they may be applied to the seed or seedlings.

Suitable liquid compositions contain, for example, from 0.1% to 25% by weight of the active compound. It is undersirable to apply compositions containing large proportions of organic liquids by spraying them on to plants or incorporating them with the soil. Liquid compositions for seed dressing based on an organic liquid may contain, for example, from 0.5% to 10% by weight of active compound in the mixture, and can conveniently be diluted with water before being sprayed. A suitable concentration of the active compound in such aqueous dispersions is from 0.1% to 2.5% by weight of the mixture. As an example, aqueous solutions containing from 0.0001% to 0.001% of active compound have given increased growth of tomatoes and peas when mixed with dry soil in pots.

The following experiments illustrate the effect of one example of active constituent on the growth of grass in field trials, the active constituent being N,N'-diethoxycarbonyl-N,N'-dinitroethylenediamine

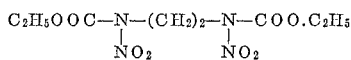

EXAMPLE 1

A solution of this compound was prepared by dissolving it in acetone, diluting with water and heating, a small quantity of polyoxyethylene sorbitan monolaurate being added to give a concentration of 0.1% in the final solution; the final concentration of active constituent was also 0.1% by weight. This liquid composition has plant growth promoting properties. It was prepared as above described and applied to a 3 year ley composed of timothy, meadow fescue and white clover at a dosage of 100 gallons/acre, after the sward had been cut to a height of approximately two inches. This treatment resulted in an increase in growth rate of the grass which was manifested in an increased height of sward soon after treatment as compared with a control of untreated grass. The stimulatory effect was visible after a first cutting of the grass, although no further treatment was given after cutting. It was noted that there was no yellowing of the foliage. Yield data were as follows, the first cut being made 21 days after treatment, the second cut 35 days after the first.

|  | Mean dry matter yields (cwt./acre) | | Relative dry matter yields | |
|---|---|---|---|---|
|  | 1st cut | 2d cut | 1st cut | 2d cut |
| With treatment | 14.4 | 9.3 | 131 | 127 |
| Without treatment | 11.1 | 7.3 | 100 | 100 |

EXAMPLE 2

A further series of experiments was carried out in so-called soil pot experiments. In these a solution of N,N-diethoxycarbonyl-N,N'-dinitroethylenediamine was made up by dissolving it in a buffer solution of pH value 5.91. This was made up from stock solutions of (a) dihydrogen potassium phosphate (KH$_2$PO$_4$) containing 9.078 gms./litre and (b) disodium hydrogen phosphate (Na$_2$H.PO$_4$.2H$_2$O)

containing 11.876 gms./litre, 90 mls. of solution (a) and 10 mls. of solution (b) being used to produce 1 litre of buffer solution. The final solution was made up to have a concentration of active constituent of 300 parts per million. This solution has plant growth promoting properties. The solution was prepared was applied to Italian rye grass seed (1 gm.) sown in John Innes Compost contained in 6 inch diameter by 6½ inches high glazed earthenware pots, the compost being brought to and maintained at 25% moisture content. These pots were kept in a pot culture house and when the grass in them was six inches high it was cut back to one inch and sprayed with 2.0 ml. of the solution prepared as described above. A control pot, i.e. sprayed with buffer solution alone was cut at the same time. The grass in these pots was then allowed to grow for 21 days and then cut, following which a second cut was taken after a further 28 days. An increased growth of grass was observed, and the colour of the foliage was not affected by the treatment

|  | Mean fresh weight yields (gms./pot) | | Relative fresh weight yields | |
|---|---|---|---|---|
|  | Cut 1 | Cut 2 | Cut 1 | Cut 2 |
| With spraying | 6.28 | 14.77 | 139 | 111 |
| Without spraying | 4.25 | 13.29 | 100 | 100 |

EXAMPLE 3

4 parts of N.N'-diethoxycarbonyl-N,N'-dinitro-ethylene diamine were mixed with 600 parts of china clay and the mixture ground to a fine powder. There was thus obtained a powdered composition possessing plant growth promoting properties. In particular, beneficial effect on grass growth has been observed by the application of the mixture above described at a dosage of about 600 lb. per acre.

EXAMPLE 4

Beneficial results on grass have also been observed when applying the mixture, prepared as described in Example 3, at the rate of about 600 lb. per acre, together with an ammonium nitrate chalk fertilizer at the rate of 3 cwts. per acre.

EXAMPLE 5

The growth stimulating actions of various solid and liquid compositions according to the invention were tested by examining their effects on the dwarf pea meteor, by measuring extension of the internodes.

Solid compositions were prepared as dusts by mixing china clay with the compounds to be tested, using concentrations of 5% and 25% by weight of the said compounds. The compositions were applied to the pea seeds to the extent of 0.5% by weight. In each experiment a standard test was carried out using a dust containing 10% by weight of ethylene-bis-nitro-urethane, previous experiments having shown that for this compound this concentration resulted in the maximum internode extension.

The peas were sown in rows of ten across seed flats filled with moist John Innes potting compost, the flats being covered with polyethylene sheet up to the time of emergency, after which the compost was watered as necessary. There were four rows per flat at intervals of approximately three inches. The lengths of the first five internodes were measured at about the time when the sixth internode was just beginning to grow. The first internode was taken to be that between the cotyledons and the first scale leaf. There were fifty peas per treatment.

Liquid compositions were prepared by dissolving the compounds to be tested in acetone to give solutions of 5% and 10% by weight. One 0.01 ml. drop of each solution was applied to the first true leaf of established plants just after it had unfolded. The plants were sown in two rows of ten in boxes four inches deep, and after emergence were thinned to eight peas per row. There were, therefore, forty peas per treatment. The dose rates corresponded to 500 and 1000µ gm. per plant. Measurement of internodes 3 to 7 were made at the time when internode 8 was half grown.

The mean internode lengths for each treatment are given in the following tables, the results for the dust experiments and the acetone drop experiments being recorded in Tables I and 2 respectively.

Table 1

| Experiments | Compound | Conc., percent | Length of internode (cm.) | | | | |
|---|---|---|---|---|---|---|---|
| | | | 1 | 2 | 3 | 4 | 5 |
| 1 | Control | | 2.2 | 1.0 | 1.4 | 1.6 | 1.9 |
| | Ethylene-bis-N:N'-nitro-urethane | 10 | 2.5 | 1.5 | 2.2 | 2.5 | 3.3 |
| 2 | Control | | 2.1 | 1.1 | 1.4 | 1.5 | 1.3 |
| | Ethylene-bis-N:N'-nitro-urethane | 10 | 2.8 | 1.7 | 2.1 | 2.3 | 2.5 |
| | Ethylene-bis-N:N'-nitro-methyl-carbamate | 5 | 2.5 | 1.7 | 2.0 | 2.4 | 2.4 |
| | ...do... | 25 | 3.0 | 1.9 | 2.2 | 2.4 | 2.2 |
| | Ethylene-bis-N:N'-nitro-iso-butyl-carbamate | 5 | 2.7 | 1.6 | 1.9 | 2.0 | 2.3 |
| | ...do... | 25 | 2.6 | 1.6 | 2.0 | 2.4 | 3.0 |
| | Ethylene-bis-N:N'-nitro-n-propyl-carbamate | 5 | 2.7 | 1.6 | 1.9 | 1.9 | 2.2 |
| | ...do... | 25 | 2.4 | 1.9 | 2.3 | 2.5 | 2.6 |
| 3 | Control | | 2.5 | 1.0 | 1.4 | 1.5 | 1.6 |
| | Ethylene-bis-N:N'-nitro-urethane | 10 | 3.1 | 2.0 | 2.5 | 2.7 | 2.9 |
| | Ethylene-bis-N:N'-nitro-n-butyl-carbamate | 5 | 3.0 | 1.5 | 2.2 | 2.5 | 3.0 |
| | ...do... | 25 | 3.0 | 1.9 | 2.7 | 3.0 | 3.4 |
| | Ethylene-bis-N:N'-nitro-cyclohexyl-carbamate | 5 | 2.7 | 1.3 | 1.7 | 1.9 | 2.5 |
| | ...do... | 25 | 2.9 | 1.5 | 1.8 | 2.2 | 2.8 |
| 4 | Control | | 2.5 | 1.0 | 1.3 | 1.4 | 1.6 |
| | Ethylene-bis-N:N'-nitro-urethane | 10 | 3.5 | 2.1 | 2.6 | 2.4 | 3.5 |
| | Ethylene-bis-N:N'-nitro-iso-amyl-carbamate | 5 | 2.8 | 1.4 | 1.8 | 1.9 | 2.5 |
| | ...do... | 25 | 2.9 | 1.4 | 1.9 | 2.2 | 3.3 |
| | Ethylene-bis-N:N'-nitro-iso-propyl-carbamate | 5 | 3.2 | 1.8 | 2.3 | 2.2 | 3.2 |
| | ...do... | 25 | 3.2 | 1.9 | 2.2 | 2.1 | 3.3 |

Table 2

| Experiments | Compound | Treatment, μgm. per plant | Length of internode (cm.) | | | | |
|---|---|---|---|---|---|---|---|
| | | | 3 | 4 | 5 | 6 | 7 |
| 5 | Control | | 1.4 | 2.1 | 2.5 | 2.7 | 2.8 |
| | Ethylene-bis-N:N'-nitro-urethane | 500 | 1.5 | 2.7 | 3.6 | 4.1 | 4.0 |
| | Propylene-bis-N:N'-nitro-urethane | 500 | 1.4 | 2.4 | 3.2 | 3.5 | 3.6 |
| | Trimethylene-bis-N:N'-nitro-urethane | 500 | 1.5 | 2.7 | 3.5 | 3.7 | 3.4 |
| 6 | Control | | 1.4 | 2.1 | 2.7 | 3.1 | 3.3 |
| | Ethylene-bis-N:N'-nitro-urethane | 1,000 | 1.3 | 2.4 | 3.4 | 3.9 | 4.1 |
| | Propylene-bis-N:N'-nitro-urethane | 1,000 | 1.4 | 2.3 | 2.9 | 3.3 | 3.6 |
| | Trimethylene-bis-N:N'-nitro-urethane | 1,000 | 1.4 | 2.5 | 3.3 | 3.6 | 3.4 |

Experiments with tetramethylene-bis-N:N'-nitro-ethyl carbamate showed that it caused a small increase in the growth of wheat.

By treating the medium in which plants grow, the seeds, or seedlings or the growing plants themselves, with a compound having the formula $$RO.CO.N(NO_2)—X—N(NO_2)CO.OR'$$

in which the radicals have the meanings given above, it is possible to regulate the growth of plants. The compound may be used as such or may form part of a solid composition or may be used as a solution, suspension or emulsion in a liquid.

We claim:

1. A plant growth stimulating composition which comprises, as an essential component, at least one compound of the formula:

$$RO.CO.\underset{\underset{NO_2}{|}}{N}—X—\underset{\underset{NO_2}{|}}{N}.CO.OR^1$$

wherein R and $R^1$ are selected from the group consisting of alkyl and cycloalkyl containing up to 11 carbon atoms each and X is selected from the group consisting of ethylene, trimethylene, propylene and tetramethylene, a plant growth regulant carrier for said compound and a surface active agent, said compound being present in an amount sufficient to effectively stimulate plant growth.

2. A plant growth stimulating composition which comprises, as an essential component, at least one compound of the formula:

$$RO.CO.\underset{\underset{NO_2}{|}}{N}—X—\underset{\underset{NO_2}{|}}{N}.CO.OR^1$$

wherein R and $R^1$ are selected from the group consisting of alkyl and cycloalkyl containing up to 11 carbon atoms each and X is selected from the group consisting of ethylene, trimethylene, propylene and tetramethylene, in admixture with at least one solid fertilizer, the concentration of said essential component being at least 0.1% by weight of said composition and effective for stimulating plant growth.

3. A plant growth stimulating composition which comprises, as an essential component, at least one compound of the formula:

$$RO.CO.\underset{\underset{NO_2}{|}}{N}—X—\underset{\underset{NO_2}{|}}{N}.CO.OR^1$$

wherein R and $R^1$ are selected from the group consisting of alkyl and cycloalkyl containing up to 11 carbon atoms each and X is selected from the group consisting of ethylene, trimethylene, propylene and tetramethylene, said essential component being dispersed in water including a dispersing agent and being present in a concentration of at least 0.1% by weight of the composition and effective for stimulating plant growth.

4. A process for stimulating the growth of plants and the germination of seeds which comprises treating said plants and seeds with a growth stimulating and seed germinating amount of at least one compound having the formula:

$$RO.CO.\underset{\underset{NO_2}{|}}{N}—X—\underset{\underset{NO_2}{|}}{N}.CO.OR^1$$

wherein R and $R^1$ are selected from the group consisting of alkyl and cycloalkyl containing up to 11 carbon atoms each and X is selected from the group consisting of ethylene, trimethylene, propylene and tetramethylene, the amount of said compound being insufficient to adversely effect said plants and seeds.

References Cited by the Examiner

FOREIGN PATENTS 918,882  2/1963  Great Britain.

OTHER REFERENCES

Curry et al. "J. Am. Chem. Soc.," vol 73, 1951, pages 5043–5046.

LEWIS GOTTS, *Primary Examiner.*

M. A. BRINDISI, *Examiner.*

JAMES O. THOMAS, *Assistant Examiner.*